US012252020B2

United States Patent
Zang

(10) Patent No.: US 12,252,020 B2
(45) Date of Patent: Mar. 18, 2025

(54) MONITORING AND IDENTIFYING SENSOR FAILURE IN AN ELECTRIC DRIVE SYSTEM

(71) Applicant: Robert Bosch GmbH, Stuttgart (DE)

(72) Inventor: Xiaoyun Zang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 841 days.

(21) Appl. No.: 17/256,286

(22) PCT Filed: Jun. 29, 2018

(86) PCT No.: PCT/CN2018/093654
§ 371 (c)(1),
(2) Date: Dec. 28, 2020

(87) PCT Pub. No.: WO2020/000362
PCT Pub. Date: Jan. 2, 2020

(65) Prior Publication Data
US 2021/0261003 A1 Aug. 26, 2021

(51) Int. Cl.
*G01D 3/08* (2006.01)
*B60L 3/00* (2019.01)

(52) U.S. Cl.
CPC ....... *B60L 3/0038* (2013.01); *B60L 2240/421* (2013.01); *B60L 2240/423* (2013.01);
(Continued)

(58) Field of Classification Search
CPC ............. B60L 3/0038; B60L 2240/421; B60L 2240/423; B60L 2240/425;
(Continued)

(56) References Cited

U.S. PATENT DOCUMENTS 6,804,600 B1 * 10/2004 Uluyol .................... G05B 9/02
701/100
2002/0193920 A1 12/2002 Miller et al.
(Continued)

FOREIGN PATENT DOCUMENTS

CN 102324034 A 1/2012
CN 202614273 U 12/2012
(Continued)

OTHER PUBLICATIONS

"Alberto Bellini, Advances in Diagnostic Techniques for Induction Machines, Dec. 2008, IEEE Transactions on Industrial Electronics, vol. 55, No. 12" (Year:2008) (Year: 2008).*
(Continued)

*Primary Examiner* — Hitesh Patel
*Assistant Examiner* — Michael Lukon
(74) *Attorney, Agent, or Firm* — Maginot, Moore & Beck LLP

(57) ABSTRACT

A method for monitoring and identifying sensor faults in an electric drive system of a vehicle includes collecting corresponding data using sensors in the electric drive system, inputting the collected data to an already-established sensor fault mode identification model, and determining whether a fault mode exists and a fault mode type based on the collected data using the sensor fault mode identification model. The method quickly determines the fault mode caused by a sensor fault in the electric drive system, and the fault mode type of the sensor fault.

8 Claims, 4 Drawing Sheets

(52) U.S. Cl.
CPC ... *B60L 2240/425* (2013.01); *B60L 2240/427* (2013.01); *B60L 2240/429* (2013.01); *B60L 2240/547* (2013.01); *B60L 2260/46* (2013.01)

(58) Field of Classification Search
CPC ......... B60L 2240/427; B60L 2240/429; B60L 2240/547; B60L 2260/46
See application file for complete search history.

(56) References Cited

U.S. PATENT DOCUMENTS

| | | | |
|---|---|---|---|
| 2009/0198408 | A1 | 8/2009 | Salman et al. |
| 2016/0217627 | A1* | 7/2016 | Khalaschi ................ G07C 5/02 |
| 2018/0025558 | A1 | 1/2018 | Chen et al. |
| 2018/0040171 | A1* | 2/2018 | Kundu ................ G07C 5/0808 |
| 2018/0276912 | A1* | 9/2018 | Zhou ................ G05B 23/0275 |
| 2019/0135331 | A1* | 5/2019 | Pramod ................ B62D 5/046 |
| 2019/0333291 | A1* | 10/2019 | Liu ....................... G06F 16/285 |
| 2020/0098394 | A1* | 3/2020 | Levinson ............... G06V 20/56 |

FOREIGN PATENT DOCUMENTS

| | | |
|---|---|---|
| CN | 202614372 U | 12/2012 |
| CN | 104502754 A | 4/2015 |
| CN | 104950837 A | 9/2015 |
| CN | 204904012 * | 12/2015 |
| CN | 206488924 U | 9/2017 |
| CN | 206656749 U | 11/2017 |
| JP | 2017-33526 A | 2/2017 |

OTHER PUBLICATIONS

"Alberto Bellini, Advances in Diagnostic Techniques for Induction Machines, Dec. 2008, IEEE Transactions on Industrial Electronics, vol. 55, No. 12" (Year: 2008).*

"Yi Lu Murphey, Model-Based Fault Diagnosis in Electric Drives Using Machine Learning, 2006, IEEE/ASME Transactions on Mechatronics, vol. 11, No. 3" (Year: 2006).*

International Search Report corresponding to PCT Application No. PCT/CN2018/093654, mailed Dec. 12, 2018 (Chinese and English language document) (6 pages).

* cited by examiner

MONITORING AND IDENTIFYING SENSOR FAILURE IN AN ELECTRIC DRIVE SYSTEM

This application is a 35 U.S.C. § 371 National Stage Application of PCT/CN2018/093654, filed on Jun. 29, 2018, the disclosure of which is incorporated herein by reference in its entirety.

The disclosure relates to electric drive systems, in particular to a method for monitoring and identifying sensor faults in an electric drive system.

BACKGROUND

New energy vehicles such as hybrid or pure electric vehicles are becoming more and more accepted by users, with an ever larger share of the market, due to having higher efficiency and better acceleration performance, and being friendlier to the environment. An electric drive system is the main source of motive power in such new energy vehicles. FIG. 1 shows schematically a typical electric drive system in simplified form. As shown in FIG. 1, the electric drive system comprises a battery pack 1, an inverter 2 for converting DC electricity from the battery pack 1 to AC electricity, and an electric machine 3 which is driven to run by the AC electricity from the inverter 2. The electric machine 3 is generally a permanent magnet synchronous motor. To drive the permanent magnet synchronous motor, it is necessary to detect the angular position of the rotor of the motor, in order to perform magnetic field directional control, i.e. determine the direction of the stator magnetic field which should be applied according to the magnetic field direction of the rotor permanent magnets during rotation. For this purpose, the electric drive system further comprises a position sensor 4 for detecting the rotor's angular position. The electric drive system also comprises a current sensor 5 for detecting an output current of the inverter. The inverter of the electric drive system adjusts the size and direction of the output current promptly according to real-time measurements from the position sensor and current sensor. Thus, the position sensor and current sensor are the main sensors which ensure that the electric drive system can perform real-time current control and obtain the desired torque or speed. The measurement accuracy of the position sensor and current sensor have a direct effect on the performance of the electric drive system in terms of torque ripple or efficiency. However, sensors with higher accuracy also have a higher cost. Thus, the use of software compensation algorithms has already been proposed to compensate for inaccuracy caused by low-cost sensors, but it is difficult to detect how exactly the sensor is inaccurate or what is causing such inaccuracy.

Thus, there is a need for a method for monitoring and identifying sensor faults in an electric drive system.

SUMMARY

The object of the disclosure is to provide a method for monitoring and identifying sensor faults in an electric drive system. According to the method of the disclosure, it is possible to quickly determine a fault mode caused by a sensor in an electric drive system, and a fault mode type.

A method for monitoring and identifying sensor faults in an electric drive system, comprising the steps of:
  collecting corresponding data by means of various sensors in an electric drive system of a vehicle;
  inputting the collected data to an already-established sensor fault mode identification model; and
  determining whether a fault mode exists and a fault mode type on the basis of the collected data by means of the sensor fault mode identification model.

Optionally, the method for monitoring and identifying sensor faults in an electric drive system further comprises the step of:
  after determining that a fault mode exists and a fault mode type, inputting corresponding data to fault data in a database; or after determining that no fault mode exists, inputting corresponding data to normal data in a database.

Optionally, the method for monitoring and identifying sensor faults in an electric drive system further comprises the step of:
  perfecting and updating the sensor fault mode identification model on the basis of the newly inputted fault data and/or normal data.

Optionally, the method for monitoring and identifying sensor faults in an electric drive system further comprises the step of:
  after determining that a fault mode exists and a fault mode type, running a corresponding compensation algorithm program stored in the electric drive system or a controller of the vehicle, to compensate for data inaccuracy caused by a faulty sensor.

Optionally, the sensor fault mode identification model is established on the basis of initial data by a machine learning method.

Optionally, the method for monitoring and identifying sensor faults in an electric drive system is performed on the basis of a vehicle network monitoring system, the vehicle network monitoring system comprising the electric drive system in each of multiple vehicles and a cloud capable of communicating wirelessly with each electric drive system or a controller of each vehicle, the cloud comprising a database for storing the data, and a central processing unit for performing all calculation and communication.

Optionally, the sensor fault mode identification model is established on the basis of the following formula:

$$S(\text{normal}, Flt_1, Flt_2, \ldots, Flt_n) = \text{Func}(X)$$

wherein X is an input variable reflecting variation of the electric drive system with the time domain or frequency domain, Func( ) is the sensor fault mode identification model established on the basis of historical data, and S represents a mode corresponding to corresponding data.

Optionally, X is a parameter X(t) reflecting variation of the electric drive system with the time domain, and X(t) is one or more of a motor power, a motor rotation speed, a motor torque, a DC voltage from a battery pack, a current measurement value, a position sensor measurement value, a stator temperature, an IGBT temperature, a direct-axis current, a quadrature-axis current, a direct-axis voltage and a quadrature-axis voltage.

Optionally, X is a parameter X(f) reflecting variation of the electric drive system with the frequency domain, being harmonic information, standard deviation, kurtosis or skewness acquired from a time domain variable by frequency domain calculation or statistical calculation.

According to the disclosure, it is possible to quickly determine a fault mode caused by a sensor in an electric drive system, and a fault mode type.

DETAILED DESCRIPTION

Preferred embodiments of the disclosure are described in detail below in conjunction with examples. Those skilled in the art will understand that these exemplary embodiments do not mean that any limitation is applied to the disclosure.

Figure 1:
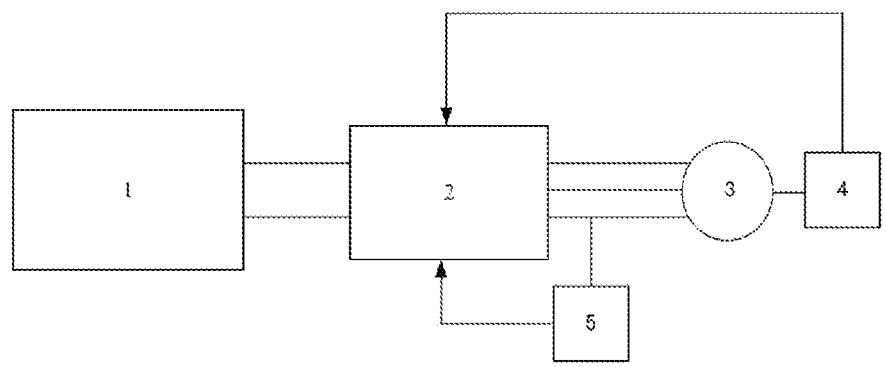
FIG. 1 shows schematically a typical electric drive system in simplified form.
Figure 2:
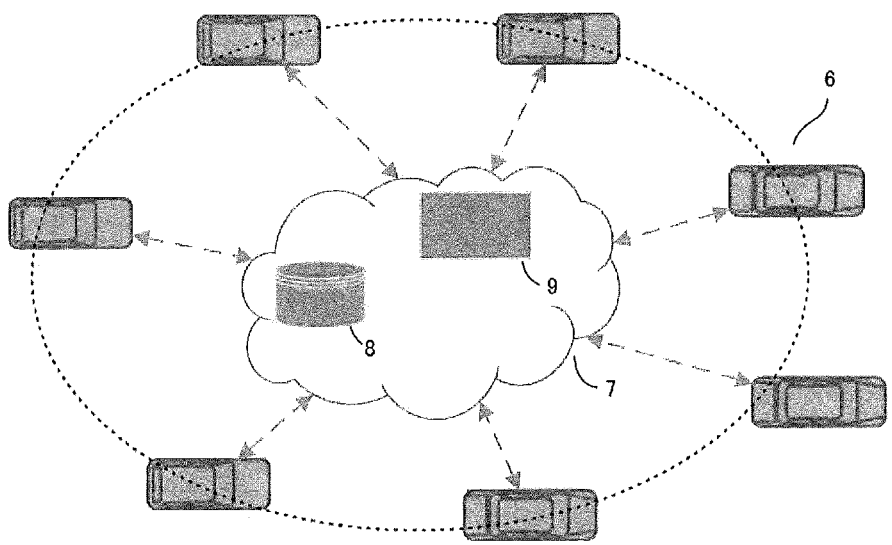
FIG. 2 shows schematically a vehicle network monitoring system.

FIG. 2 shows schematically a vehicle network monitoring system. As shown in FIG. 2, the vehicle network monitoring system comprises an electric drive system in each of multiple vehicles 6, and a cloud 7 capable of communicating wirelessly with a vehicle controller in each vehicle 6. The vehicle controller is in electrical communication with the electric drive system in the corresponding vehicle, in order to monitor the electric drive system. Data can be transmitted between the vehicle controller and the cloud. Of course, the cloud 7 may also be in direct electrical communication with, and communicate wirelessly with, the electric drive system in each vehicle 6. A typical cloud in the vehicle network monitoring system comprises a database 8 for storing data from all of the vehicles, and a central processing unit 9 for performing all necessary calculation and communication.

Figure 3:
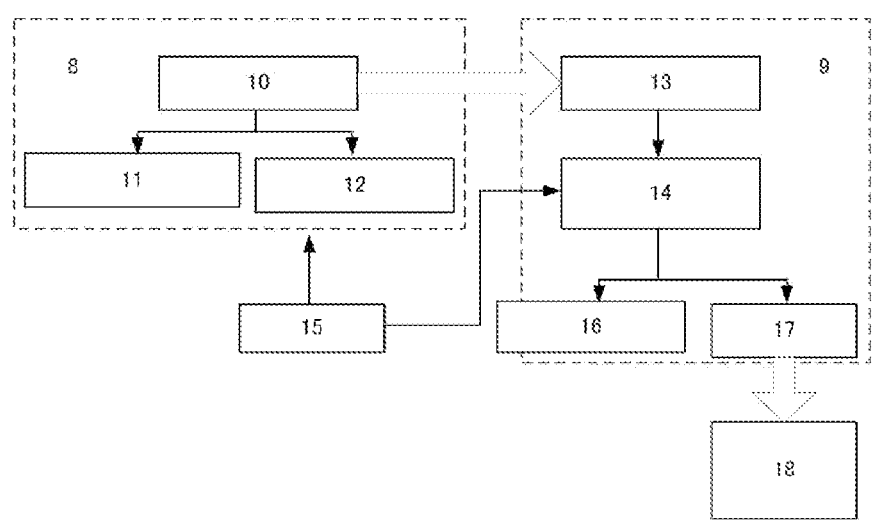
FIG. 3 is a schematic drawing explaining the method for monitoring and identifying sensor faults in an electric drive system according to the disclosure.

The method for monitoring and identifying sensor faults in an electric drive system according to the disclosure uses the vehicle network monitoring system as a basic platform. FIG. 3 is a schematic drawing explaining the method for monitoring and identifying sensor faults in an electric drive system according to the disclosure. The cloud collects all necessary data from each of the multiple interconnected vehicles and stores same in the database 8. Data for monitoring and identifying sensor faults in an electric drive system includes but is not limited to: current sensor measurement values, position sensor measurement values, battery pack DC voltage, stator temperature, insulated gate bipolar transistor (IGBT) temperature, motor rotation speed, motor torque, motor power, etc. Various data collected on each occasion from each of the multiple interconnected vehicles are called a data set 10; the data in the data set is divided into normal data 11 and fault data 12, and stored in the database 8 as historical data. Normal data is sensor measurement values when vehicle operation is normal; fault data is sensor measurement values when vehicle operation is abnormal, i.e. when a fault has occurred. For example, when a vehicle experiences vibration or a fault such as insufficient motive power, a gain error or offset error might occur in the measurement value of the current sensor, or a gain error or offset error might occur in the measurement value of the position sensor. When a gain error occurs in the measurement value of the current sensor, this will cause torque ripple, and the frequency of this type of torque ripple is generally double the frequency of the output current of the inverter; when an offset error occurs in the measurement value of the current sensor, this will also cause torque ripple, and the frequency of this type of torque ripple is generally the same as the frequency of the output current of the inverter. When a gain error or offset error occurs in the measurement value of the position sensor, in both cases the result will be that the output torque of the motor is lower than the desired torque. Thus, it is possible to determine possible sensor fault types according to the vehicle fault situation, e.g. what type of fault has occurred in which sensor. The measurement value of the sensor in which the fault has occurred can then be subjected to compensation, in order to eliminate the inaccuracy thereof, by means of a compensation algorithm program stored in the inverter or vehicle controller. Initial fault data (historical data) can be acquired online by a fault detection method of the vehicle itself when a fault occurs during vehicle operation (e.g. in the case of a fault which occurs in the position sensor), or acquired offline by vehicle maintenance personnel removing the sensor.

The central processing unit 9 of the cloud then performs data processing by means of a machine learning method 13 on the basis of the initial historical data acquired, in order to establish a sensor fault mode identification model 14. There are many machine learning methods that are capable of performing these functions, e.g. artificial neural networks, clustering, similarity and metric learning, etc., in order to establish the sensor fault mode identification model. It is possible to identify or determine various fault modes and normal modes by means of the sensor fault mode identification model. An input of the sensor fault mode identification model is a new data set 15 collected from each vehicle, and an output of the sensor fault mode identification model is whether a fault mode exists 16, and a fault mode type 17. Information relating to fault mode type is then transmitted to the inverter or vehicle controller, in order to run a compensation algorithm program 18 at the electric drive system side, in order to subject the measurement value inaccuracy of the faulty sensor to compensation. The new data set 15 collected from each vehicle is also simultaneously transmitted to the database 8 as historical data, to further perfect and update the database 8.

For a vehicle that joined the vehicle network monitoring system at an early stage, it might be necessary to perform initial historical fault data acquisition offline, but it is not necessary to perform initial historical fault data acquisition offline for a vehicle that joined the vehicle network monitoring system after a fault identification model was established; instead, data thereof is inputted directly to the fault identification model to perform identification and simultaneously inputted to the database 8 to further perfect and update the database 8. With the aid of Big Data that is continuously collected from the various vehicles, it is possible to continuously perfect the sensor fault mode identification model.

More specifically, the sensor fault mode identification model is established on the basis of the following formula:

$$S(\text{normal}, Flt_1, Flt_2, \ldots, Flt_n) = \text{Func}(X)$$

wherein X is an input variable that reflects the variation of the vehicle's electric drive system with the time domain or frequency domain, and is collected and stored in the database of the cloud. When X is a parameter $X(t)$ reflecting variation of the electric drive system with the time domain, $X(t) = [P, n_{motor}, T_e, U_{dc}, I_{sc}, \theta, T_c, T_{igbt}, I_d, I_q, U_d, U_q \ldots]$, wherein P is the motor power P, $n_{motor}$ is the motor rotation speed, $T_e$ is the motor torque, $U_{dc}$ is the DC voltage from the battery pack, $I_{ac}$ is the current measurement value, $\theta$ is the position sensor measurement value, $T_s$ is the stator temperature, $T_{igbt}$ is the IGBT temperature, $I_d$ is the direct-axis current, $I_q$ is the quadrature-axis current, $U_d$ is the direct-axis voltage, $U_q$ is the quadrature-axis voltage . . . . X(t) may be any one or more of these parameters.

When X is a parameter X(f) reflecting variation of the electric drive system with the frequency domain, X(f) is harmonic information, standard deviation, kurtosis, skewness, etc., acquired from a time domain variable by frequency domain calculation or statistical calculation.

Func( ) is the sensor fault mode identification model established on the basis of historical data stored in the vehicle network monitoring system or stored in the cloud. As stated above, the sensor fault mode identification model may be established by any suitable machine learning method, such as an artificial neural network, cluster analysis, etc. $S(normal, Flt_1, Flt_2, \ldots, Flt_n)$ is an output of the sensor fault mode identification model, and represents a mode corresponding to normal data, a fault type 1 ($Flt_1$), a fault type 2 ($Flt_2$), . . . , a fault type n ($Flt_n$). For example, in the case of a normal situation, a fault caused by a current sensor measurement value gain error, a fault caused by a current sensor measurement value offset error, a fault caused by a position sensor measurement value gain error, a fault caused by a position sensor measurement value offset error, etc., the output of $S(normal, Ft_1, Flt_2, \ldots, Flt_n)$ may use the numbers 000, 001, 010, 100, 011, 110, 101, 111, etc. to represent the corresponding fault modes.

Figure 4:
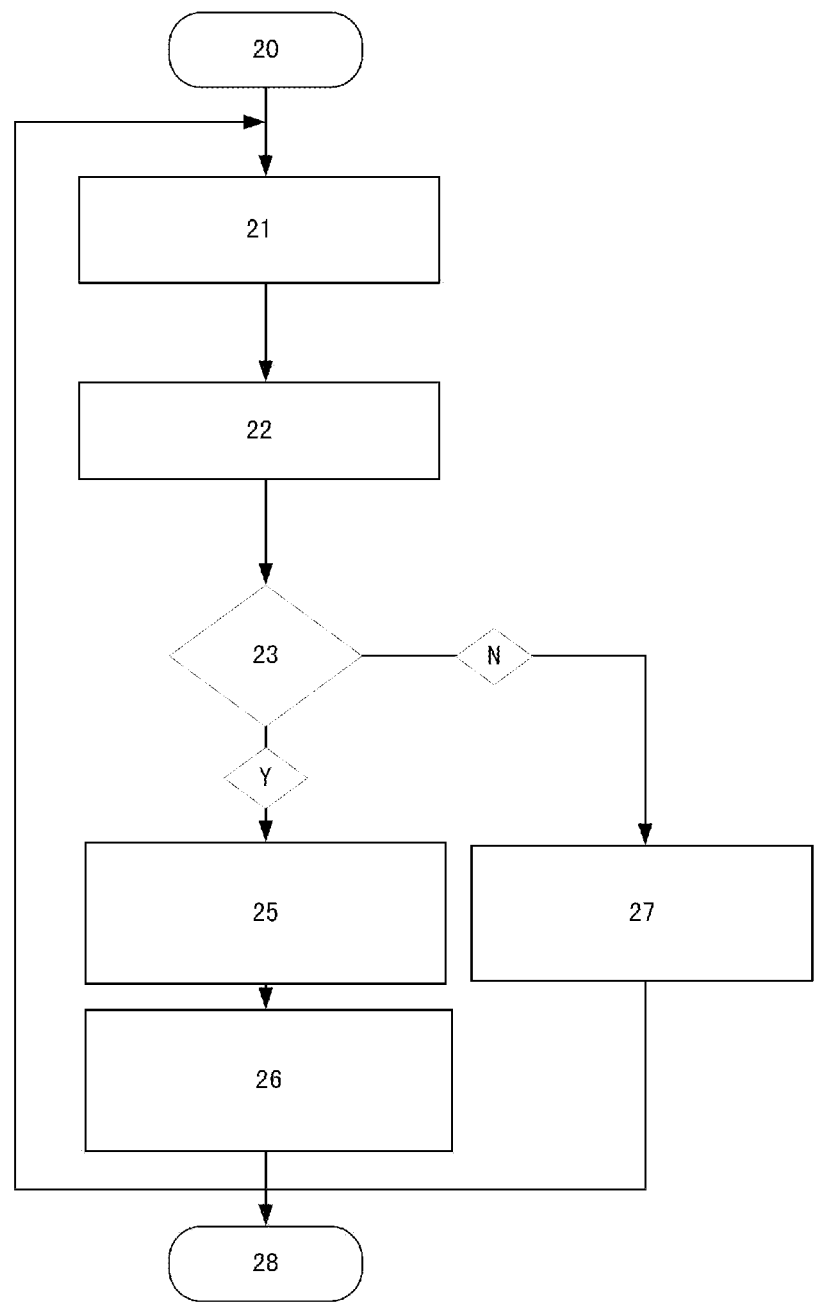
FIG. 4 is a flow chart showing a preferred embodiment of the method for monitoring and identifying sensor faults in an electric drive system according to the disclosure.

FIG. 4 is a flow chart showing a preferred embodiment of the method for monitoring and identifying sensor faults in an electric drive system according to the disclosure. As shown in FIG. 4, the method for monitoring and identifying sensor faults in an electric drive system according to the disclosure starts at step 20; the starting step may start at a set time. In step 21, various corresponding necessary data are collected by means of various sensors on a vehicle such as a position sensor, current sensor, voltage sensor and temperature sensor, and transmitted to a central processing unit in a cloud. In step 22, the various collected data are applied to an already-established sensor fault mode identification model to perform fault mode type identification. In step 23, a determination is made as to whether a fault exists. If a fault indeed exists, in step 25, corresponding data is added to fault data of a database. In step 26, a compensation algorithm program in an inverter or a vehicle controller is activated according to a known fault mode. It should be understood that steps 25 and 26 may be performed simultaneously, or step 26 may be performed before step 25. If there is no fault, in step 27, corresponding data is added to normal data of the database. After step 26 or 27, the method for monitoring and identifying sensor faults in an electric drive system according to the disclosure returns to step 21, and the above steps are repeated. If a set operating time has been reached, the method for monitoring and identifying sensor faults in an electric drive system according to the present-invention disclosure ends at step 28.

According to the disclosure, once a fault mode has been identified, the central processing unit will communicate with the corresponding electric drive system, and if necessary activate the compensation algorithm program stored in the electric drive system or vehicle controller with a suitable parameter, to compensate for a sensor error. Thus, optimal performance of the electric drive system can be maintained even when a fault occurs in a sensor.

Vehicles that join the vehicle network monitoring system should have identical electric drive systems. If the number of vehicles joining the vehicle network monitoring system is greater, the amount of data acquired will be greater, and this will be of greater help in perfecting the sensor fault mode identification model, and therefore more favourable for increasing the accuracy with which sensor faults in the electric drive system are monitored and identified.

Although, in the above preferred embodiments, the sensor fault mode identification model is established on the basis of data from the database of the cloud of the vehicle network monitoring system, it should be understood that it is also possible to establish the sensor fault mode identification model on the basis of historical data of a single electric drive system, and the sensor fault mode identification model can then be applied to new operating data, in order to monitor and identify newly developed sensor faults in the same electric drive system.

The disclosure has been described in detail above in conjunction with specific preferred embodiments. The embodiments described above and displayed in the drawings are exemplary, and should not limit the disclosure. Those skilled in the art should understand that various amendments and alterations may be made without departing from the spirit of the disclosure, and such amendments and alterations will not depart from the scope of protection of the disclosure.

The invention claimed is:

1. A method for monitoring and identifying sensor faults in an electric drive system of a vehicle, comprising:
   collecting corresponding data using sensors in the electric drive system of the vehicle, the vehicle included in a plurality of vehicles each having a corresponding electric drive system;
   transmitting the collected data to a cloud computing system configured to communicate wirelessly with a controller of each vehicle of the plurality of vehicles;
   inputting the collected data to an already-established sensor fault mode identification model of the cloud computing system;
   determining whether a fault mode exists and a fault mode type based on the collected data using the sensor fault mode identification model;
   when it is determined that the fault mode exists, running a corresponding compensation algorithm program stored in the controller of the vehicle, to compensate for data inaccuracy caused by a faulty sensor of the sensors in the electric drive system of the vehicle; and
   operating the electric drive system of the vehicle based on compensated data from the faulty sensor,
   wherein the sensor fault mode identification model is based on:

$$S(normal, Flt_1, Flt_2, \ldots, Flt_n) = Func(X)$$

wherein X is an input variable corresponding to a variation of the electric drive system with a time domain or a frequency domain,
   wherein Func(X) is the sensor fault mode identification model established based on initial data,
   wherein S corresponds to the fault data and the normal data, and
   wherein X includes a parameter X(f) corresponding to a variation of the electric drive system with the frequency domain, and is one or more of harmonic information, standard deviation, kurtosis, or skewness acquired from a time domain variable by frequency domain calculation or statistical calculation.

2. The method for monitoring and identifying sensor faults according to claim 1, further comprising:
  after determining that the fault mode exists and the fault mode type, inputting the fault data in a database, the fault data corresponding to the fault mode and/or the fault mode type; or
  after determining that the fault mode does not exist, inputting the normal data in the database, the normal data indicating that the fault mode does not exist.

3. The method for monitoring and identifying sensor faults according to claim 2, further comprising:
  optimizing and updating the sensor fault mode identification model based on the fault data and/or the normal data.

4. The method for monitoring and identifying sensor faults according to claim 1, wherein the sensor fault mode identification model is established based on initial data by a machine learning method.

5. The method for monitoring and identifying sensor faults according to claim 1, wherein the cloud computing system comprises a database for storing the collected data, and a central processing unit for performing calculations and communication.

6. The method for monitoring and identifying sensor faults according to claim 1, wherein:
  the faulty sensor outputs an inaccurate measurement value, and
  the compensated data corresponds to a measurement value in which an inaccuracy has been eliminated.

7. A method for monitoring and identifying sensor faults in an electric drive system of a vehicle, comprising:
  collecting corresponding data using sensors in the electric drive system of the vehicle, the vehicle included in a plurality of vehicles each having a corresponding electric drive system;
  transmitting the collected data to a cloud computing system configured to communicate wirelessly with a controller of each vehicle of the plurality of vehicles;
  inputting the collected data to an already-established sensor fault mode identification model of the cloud computing system;
  determining whether a fault mode exists and a fault mode type based on the collected data using the sensor fault mode identification model;
  when it is determined that the fault mode exists, running a corresponding compensation algorithm program stored in the controller of the vehicle, to compensate for data inaccuracy caused by a faulty sensor of the sensors in the electric drive system of the vehicle; and
  operating the electric drive system of the vehicle based on compensated data from the faulty sensor,
  wherein the sensor fault mode identification model is based on:

$$S(normal, Flt_1, Flt_2, \ldots, Flt_n) = \mathrm{Func}(X)$$

wherein X is an input variable corresponding to a variation of the electric drive system with a time domain or a frequency domain as detected by another sensor of the sensors in the electric drive system,
  wherein Func(X) is the sensor fault mode identification model,
  wherein S corresponds to the fault data and the normal data,
  wherein the faulty sensor is an electrical current sensor,
  wherein the other sensor is a torque sensor, and
  wherein X includes a parameter X(f) corresponding to a variation of the electric drive system with the frequency domain, and is one or more of harmonic information, standard deviation, kurtosis, or skewness acquired from a time domain variable by frequency domain calculation or statistical calculation.

8. The method for monitoring and identifying sensor faults according to claim 7, wherein;
  X further includes a parameter X(t) corresponding to a variation of the electric drive system with the time domain from the other sensor, such that collected data from the other sensor is used to determine that the fault mode exists as caused by the faulty sensor, and
  the parameter X(t) includes one or more of a motor power, a motor rotation speed, a motor torque, a DC voltage from a battery pack, a current measurement value, a position sensor measurement value, a stator temperature, an insulated gate bipolar transistor temperature, a direct-axis current, a quadrature-axis current, a direct-axis voltage, and a quadrature-axis voltage.

* * * * *